US008314947B2

(12) United States Patent  
Tsuji

(10) Patent No.: US 8,314,947 B2
(45) Date of Patent: Nov. 20, 2012

(54) MULTIFUNCTIONAL INPUT/OUTPUT APPARATUS, CONTROL METHOD THEREOF, AND COMPUTER PROGRAM PRODUCT

(75) Inventor: Shigekazu Tsuji, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 642 days.

(21) Appl. No.: 12/230,292

(22) Filed: Aug. 27, 2008

(65) Prior Publication Data

US 2009/0059264 A1 Mar. 5, 2009

(30) Foreign Application Priority Data

Aug. 28, 2007 (JP) ................. 2007-220918

(51) Int. Cl.
*G06F 3/12* (2006.01)
(52) U.S. Cl. ........... 358/1.13; 358/1.2; 235/462.09; 235/462.1; 235/462.14; 235/462.41
(58) Field of Classification Search ............... 358/1.18, 358/1.13; 235/462.09, 462.1, 462.14, 462.41
See application file for complete search history.

(56) References Cited

U.S. PATENT DOCUMENTS

| | | | |
|---|---|---|---|
| 6,572,025 B1 | 6/2003 | Nishikado et al. | |
| 7,187,407 B2 | 3/2007 | Kanehiro et al. | |
| 7,492,945 B2 * | 2/2009 | Yamazaki et al. | ............ 382/187 |
| 7,869,082 B2 * | 1/2011 | Hayashida et al. | .......... 358/1.18 |
| 2003/0086127 A1 * | 5/2003 | Ito et al. | ........................ 358/462 |
| 2004/0114171 A1 * | 6/2004 | Shindoh et al. | ............... 358/1.13 |
| 2005/0185229 A1 * | 8/2005 | Sano et al. | .................... 358/498 |
| 2006/0126095 A1 | 6/2006 | Tamura et al. | |
| 2007/0030516 A1 | 2/2007 | Tsuji et al. | |
| 2007/0091322 A1 * | 4/2007 | Tano | ............................ 356/610 |
| 2007/0201074 A1 * | 8/2007 | Tashiro et al. | ............... 358/1.13 |

FOREIGN PATENT DOCUMENTS

| | | |
|---|---|---|
| JP | 9-261382 | 10/1997 |
| JP | 11-187247 | 7/1999 |
| JP | 11-275344 | 10/1999 |
| JP | 2000-174943 | 6/2000 |
| JP | 2002-354212 | 12/2002 |
| JP | 2003-236836 | 8/2003 |
| JP | 2005-086709 | 3/2005 |
| JP | 2006-166155 | 6/2006 |
| JP | 2006-217545 | 8/2006 |
| JP | 2007-221747 | 8/2007 |
| JP | 2006-023912 | 1/2008 |

OTHER PUBLICATIONS

Japanese Office Action dated Sep. 6, 2011 for Application 2007-220918.

* cited by examiner

*Primary Examiner* — Benny Q Tieu
*Assistant Examiner* — Juan Guillermety
(74) *Attorney, Agent, or Firm* — Harness, Dickey & Pierce, P.L.C.

(57) ABSTRACT

A decoding unit decodes, when original data obtained from an original contains symbolic information that is encoded information of a predetermined operation instruction, the symbolic information to obtain the operation instruction. An executing unit executes an operation indicated by the operation instruction obtained by the decoding unit. A reading unit reads a specific area of the original preassigned for the symbolic information. When the symbolic information is obtained from the specific area, the decoding unit decodes the symbolic information obtained from the specific area.

15 Claims, 11 Drawing Sheets

DEVICE-CONTROL SETTING
INFORMATION CONVERTED
INTO TWO-DIMENSIONAL CODE (2480, 3508)

(0, 0)

DEVICE-CONTROL SETTING
INFORMATION CONVERTED
INTO TWO DIMENSIONAL CODE

DEVICE-CONTROL SETTING
INFORMATION CONVERTED
INTO TWO DIMENSIONAL CODE

MULTIFUNCTIONAL INPUT/OUTPUT APPARATUS, CONTROL METHOD THEREOF, AND COMPUTER PROGRAM PRODUCT

CROSS-REFERENCE TO RELATED APPLICATIONS

The present application claims priority to and incorporates by reference the entire contents of Japanese priority document 2007-220918 filed in Japan on Aug. 28, 2007.

BACKGROUND OF THE INVENTION

1. Field of the Invention

The present invention relates to a multifunctional input/output apparatus, a control method thereof, and a computer program product.

2. Description of the Related Art

Recently, multiple functions in digital copiers lead to a wide use of various digital copiers of a multifunctional type having a plurality of functions such as a printer, a scanner, and a facsimile. To use the functions provided in the digital copier effectively, the number of setting items such as an image formation parameter that needs to be set by a user increases. However, for example, when a liquid crystal display or hard keys are provided as an input unit for inputting a setting to the digital copier, a size of the liquid crystal display or the number of the hard keys is limited. Accordingly, the number of layers displayed for switching display screens, using the liquid crystal display, of a setting menu tends to increase. The user may find this inconvenient to use.

To solve such a problem, for example, Japanese Patent Application Laid-open No. H9-261382 discloses a technology in which an image forming parameter is recorded in an optically readable state by a barcode or the like, and that parameter is read and recognized by a scanner of a digital copier, thereby automatically setting the image forming parameter.

As an object to significantly shorten a reading time when such an image forming parameter is optically read, Japanese Patent Application Laid-open No. 2006-23912 discloses an "Information Code Reading Device and Information-Code Reading Method" in which a central processing unit (CPU) configuring a reading device causes a complementary metal-oxide semiconductor (CMOS) image sensor to execute "row skipping scan" to determine a location including in an information code and causes the CMOS image sensor to continuously scan only a portion involving the location including this information code, thereby performing a decode process on image data output at this time.

Recently, the digital MFP is regarded as one terminal on a network, and because of the digital MFP, a handwriting original or a paper resource can be digitalized, and as a result, these digitalized materials can be shared and utilized on the network. Furthermore, the digital MFP includes a function of delivering an input image from the digital MFP to a predetermined personal computer.

However, the conventional technologies are adapted such that an entire surface of the original data is loaded and an information code area is recognized and read from the loaded data. Thus, there are problems in that search efficiency is poor and it takes a long time for loading. Therefore, a much faster loading time has been desired. Furthermore, when the entire surface is loaded, it is probable that a redundant rectangular is extracted so that erroneous detections can be made.

SUMMARY OF THE INVENTION

It is an object of the present invention to at least partially solve the problems in the conventional technology.

According to an aspect of the present invention, there is provided a multifunctional input/output apparatus that includes a reading unit that reads an original to obtain original data; an image forming unit that forms an image on a recording medium based on the original data; a decoding unit that decodes, when the original data contains symbolic information that is encoded information of a predetermined operation instruction, the symbolic information to obtain the operation instruction; and an executing unit that executes an operation indicated by the operation instruction obtained by the decoding unit, wherein the reading unit reads a specific area of the original preassigned for the symbolic information, and when the symbolic information is obtained from the specific area, the decoding unit decodes the symbolic information obtained from the specific area.

According to another aspect of the present invention, there is provided a method of controlling a multifunctional input/output apparatus that includes a reading unit that reads an original to obtain original data and an image forming unit that forms an image on a recording medium based on the original data, the method includes decoding, when the original data contains symbolic information that is encoded information of a predetermined operation instruction, the symbolic information to obtain the operation instruction; and executing an operation indicated by the operation instruction obtained at the decoding, wherein the reading includes reading a specific area of the original preassigned for the symbolic information, and when the symbolic information is obtained from the specific area, the decoding includes decoding the symbolic information obtained from the specific area.

According to still another aspect of the present invention, there is provided a computer program product including a computer-usable medium having computer-readable program codes embodied in the medium for controlling a multifunctional input/output apparatus that includes a reading unit that reads an original to obtain original data and an image forming unit that forms an image on a recording medium based on the original data, the program codes when executed causing a computer to execute: the above method.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
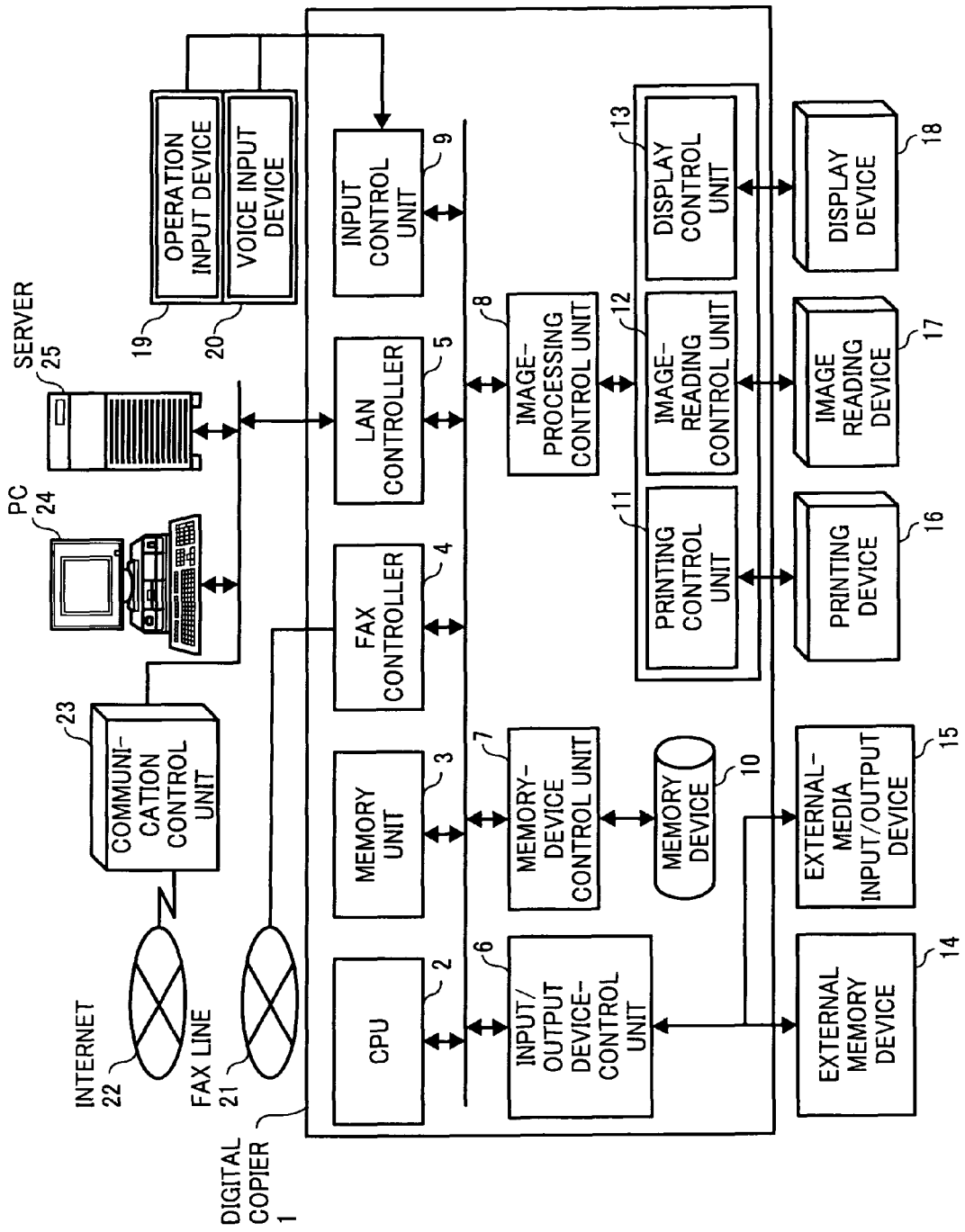
FIG. 1 is a block diagram of a schematic configuration of a digital copier according to a first embodiment of the present invention.

FIG. 1 is a block diagram of a schematic configuration of a digital copier 1 as a multifunctional input/output apparatus according to the first embodiment of the present invention. The digital copier includes a known function for creating and utilizing a device-control setting medium (original) to perform an effective application, as described in detail later.

As shown in FIG. 1, the digital copier 1 includes a CPU 2, a memory unit 3 configured by a read only memory (ROM), a random access memory (RAM) or the like, a facsimile (FAX) controller 4, a local area network (LAN) controller 5, an input/output device-control unit 6, a memory-device control unit 7, an image-processing control unit 8 (including a text-direction recognizing unit 8a, an original-direction recognizing unit 8b, and an image converting unit 8c (all not shown)), and an input control unit 9. The digital copier 1 further includes a memory device 10 configured by a built-in hard disk drive (HDD) or the like, connected to the memory-device control unit 7, a printing control unit 11 connected to the image-processing control unit 8, an image-reading control unit 12, and a display control unit 13.

The FAX controller 4 transmits and receives facsimile data to and from a different FAX machine via a FAX line 21. The LAN controller 5 is connected to an external device via the Internet 22 and a communication control unit 23 such as a modem and a router. The LAN controller 5 is also connected to a personal computer (PC) 24 and a server computer (hereinafter, "server") 25 by cable or by radio. Therefore, the LAN controller 5 transmits and receives data to and from an external device, the PC 24, and the server 25.

The input/output device-control unit 6 inputs and outputs data from and to an external memory device 14 such as a connected external HDD, or various media such as a multimedia card (registered trademark), a smart media (registered trademark), a memory stick (registered trademark), a secure digital (SD) memory card (registered trademark), a compact disk ROM (CD-ROM), a floppy (registered trademark) disk, and a universal serial bus (USB) memory (registered trademark), each of which media is connected by an external-media input/output device 15.

The image-processing control unit 8 inputs and outputs data by a printing device 16 that is adapted to perform monochrome, color, and double-sided printing via the printing control unit 11 and is configured by a laser printer, an ink-jet printer or the like, an image reading device 17 (as an optical reading unit) that reads an original image by optical processing or the like, via the image-reading control unit 12, and a display device 18 configured by a touch panel, a cathode ray tube (CRT), a liquid crystal display or the like, via the display control unit 13.

The image-processing control unit 8 uses the text-direction recognizing unit 8a and the original-direction recognizing unit 8b to recognize directions of an image data character on the memory unit 3 at respective directions of 0 degree, 90 degrees, 180 degrees, and 270 degrees, thereby distinguishing whether a text in the original data is portrait or landscape and distinguishing a top edge from a bottom edge of the original. The image converting unit (image compressing/decompressing unit) 8c is used to compress and decompress the image data.

Furthermore, the input control unit 9 is an operation input device 19 configured by a touch panel or key buttons. When the touch panel or the key buttons are pressed, or when input is performed by way of a voice by a voice input device 20 configured by a microphone, the input control unit 9 enables to perform an input/output operation.

The CPU 2 controls a main body of the digital copier 1 in accordance with a control program stored in the memory unit 3. The CPU 2 controls the FAX controller 4, the LAN controller 5, the input/output device-control unit 6, the memory-device control unit 7, the image-processing control unit 8, and the input control unit 9 in accordance with a processing program stored in the memory device 10 and expanded in the memory unit 3, if needed. A part or all of the control programs of the multifunctional input/output apparatus can be supplied by a recording medium recorded in a format readable by the multifunctional input/output apparatus.

The digital copier has a known function for creating and utilizing an original, as a device-control setting medium, to perform an effective application. The device-control setting medium (original) used herein indicates an optically readable medium, such as a printing paper, printed thereon with setting information (device-control setting information) for controlling a digital copier as symbolic information encoded into a two-dimensional code such as quick response (QR) code (registered trademark). For a two-dimensional code of this type, besides the QR code adopted in the first embodiment, a data matrix (registered trademark), PDF 417 (registered trademark) of a barcode, or the like are well known. The control used herein indicates at least one of a setting for a predetermined operation and a predetermined operation instruction of the digital copier.

Figure 3:
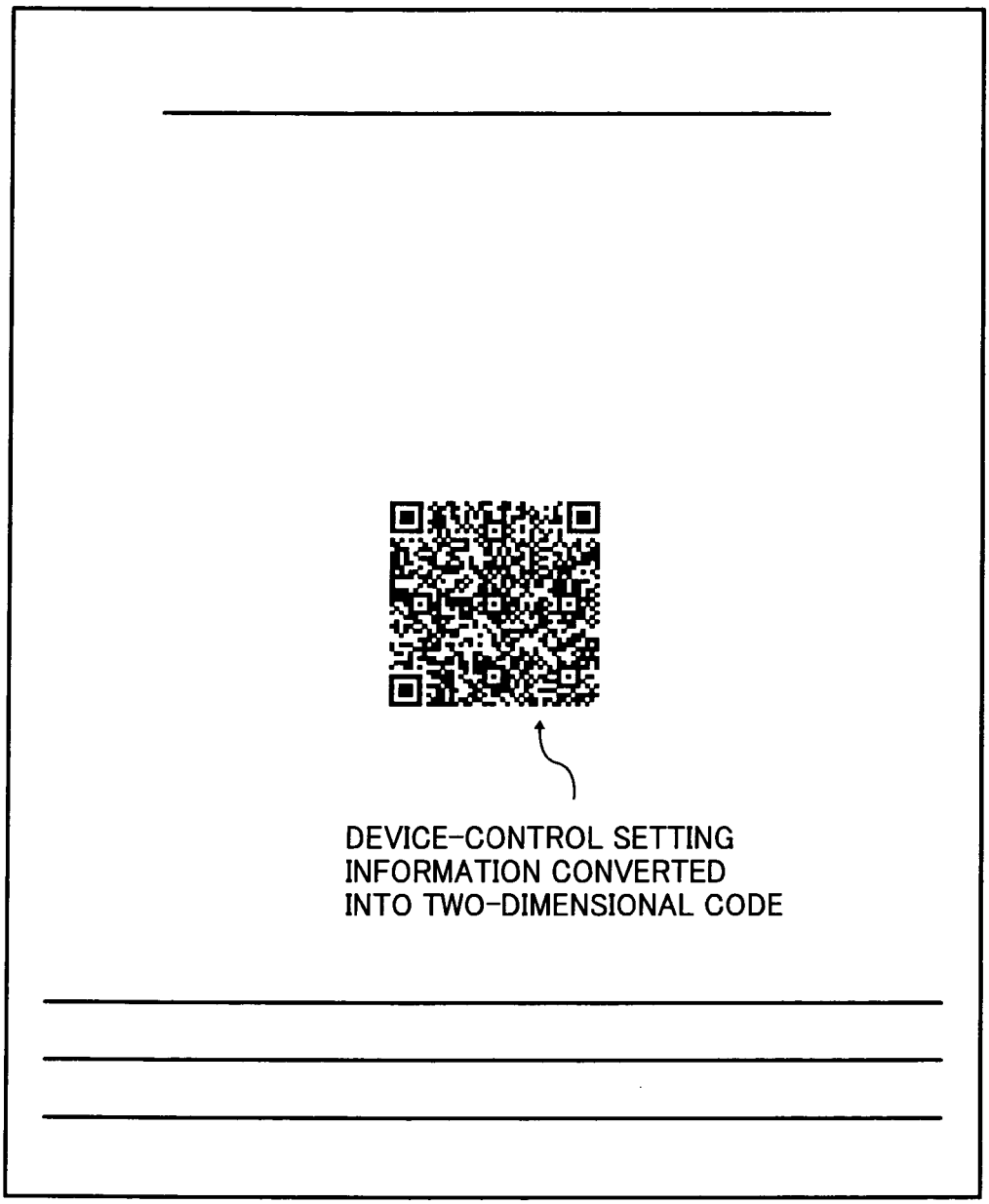
FIG. 3 is a schematic diagram of an original (device-control setting medium) according to the first embodiment.

The original as the device-control setting medium used herein is recorded thereon with the setting information or control information by means of the QR code or symbolic information. FIG. 3 is a schematic diagram of a layout in which the symbolic information is arranged on the original. The control information used herein can include an operation execution instruction in addition to a unit name of a control target and a setting content (a setting item and a value) of an operation of the unit.

In a conventional device utilizing such an original (device-control setting medium), the entire pixel data of a reading original is loaded via an area sensor or the like, the loaded data is written into a memory, and then a two-dimensional code is searched for over the entire pixel data (entire original surface), thereby performing a determining process of the two-dimensional code. On the other hand, in the first embodiment, a location of loading the two-dimensional code on the original is determined beforehand. This makes it possible to shorten a time for recognizing the two-dimensional code in the original data, and this also prevents erroneous detections.

Figure 2:
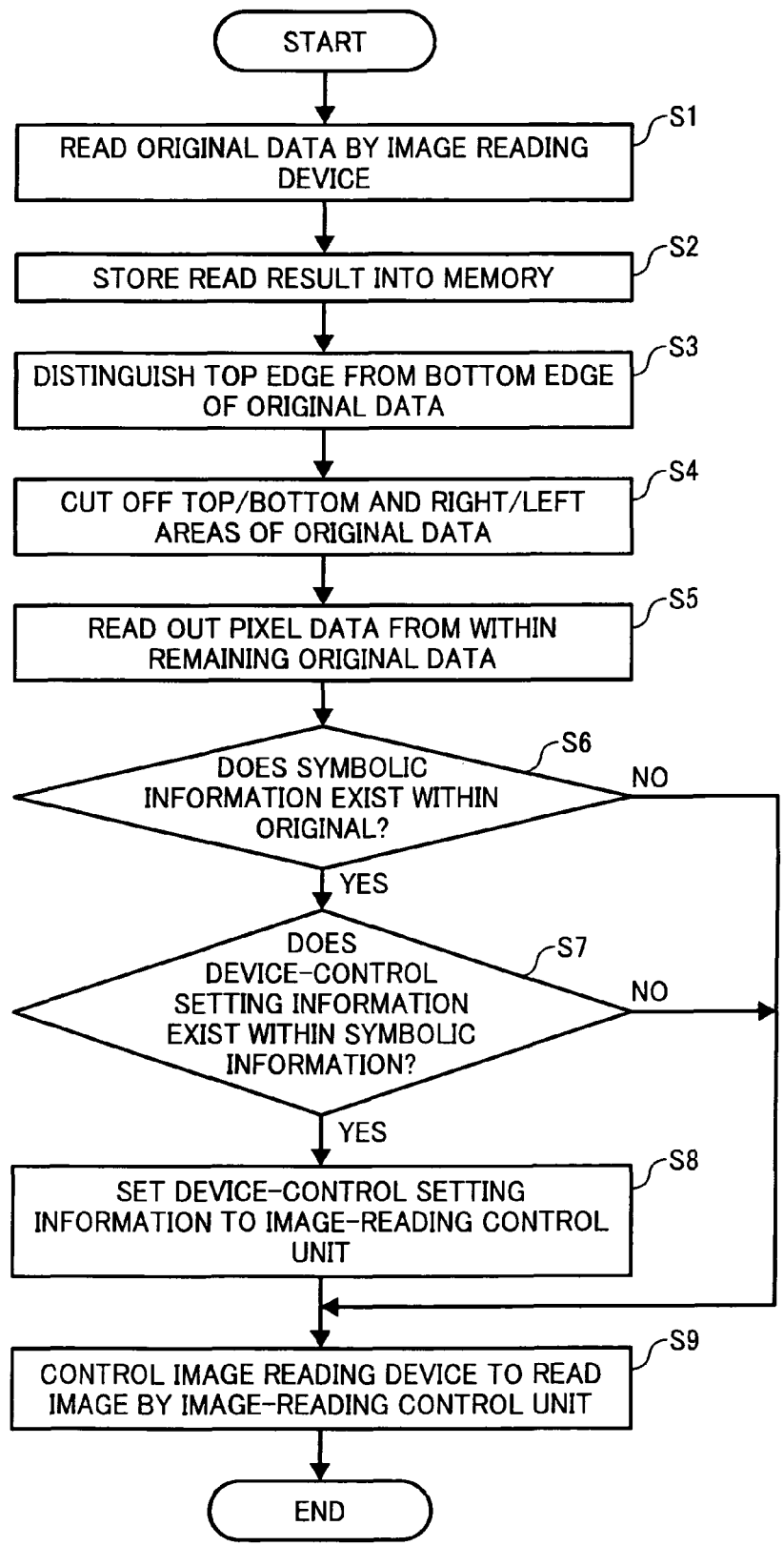
FIG. 2 is a flowchart of a method of utilizing a device-control setting medium (original) in the digital copier according to the first embodiment.

FIG. 2 is a flowchart of a method of utilizing the device-control setting medium (original) in the digital copier according to the first embodiment, which is explained with reference to FIG. 1. As shown in FIG. 2, at first, a user uses the image reading device 17 in the digital copier 1 to load the original (Step S1). The user places the original on the image reading device 17 (for example, an optical original reading table) to perform a reading start operation by the operation input device 19. Thereby, the input control unit 9 performs the reading start operation, and an instruction signal is transmitted to the CPU 2.

In response thereto, the CPU 2 causes the image-processing control unit 8 to execute operation control of the image-reading control unit 12. The image-reading control unit 12 appropriately controls the image reading device 17 to read and digitalize an original surface, and stores the result in the memory unit 3 (Step S2).

A size of the image data on the memory unit 3 at this time is expressed by a horizontal width and a height. When a data format is a bitmap format, the size of the image data is expressed by a two-dimensional coordinate system where a lower left of a data area serves a point of origin coordinate and the horizontal width represents an x-axis and the height represents a y-axis.

Figure 4:
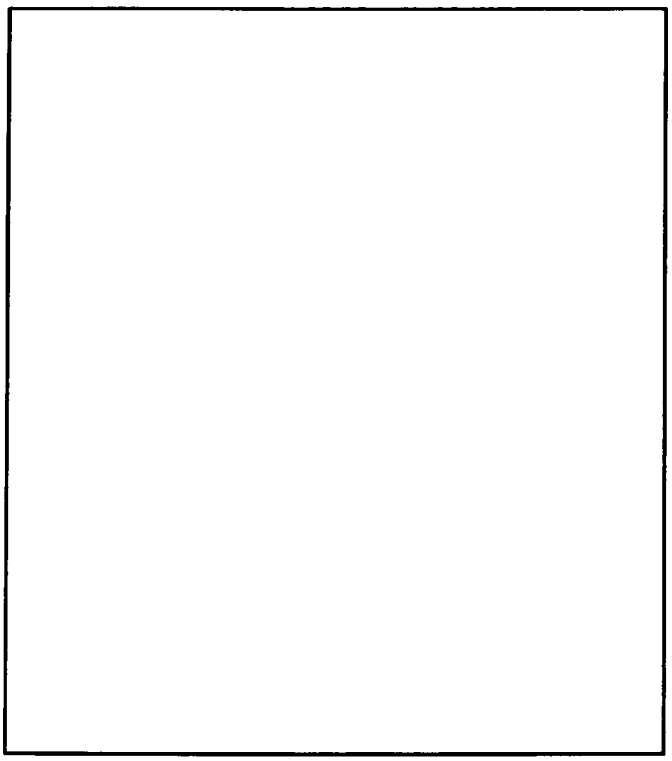
FIG. 4 is a schematic diagram of an xy-coordinate system of original image data on a memory.

For example, when A4 original data (vertical) of 300 dots per inch (dpi) is assumed, the horizontal width is 2,480 pixels, the height is 3,508 pixels, and the range of coordinate is xy-coordinates of (0, 0) to (2,480, 3,508). The xy-coordinate system of the original image data in this case is shown in FIG. 4.

Upon completion of reading and storing the original data, the original data is analyzed by the image-processing control unit 8. The CPU 2 cuts out a character area in the original data. Directions of the character in the cut-out character area are recognized by the text-direction recognizing unit 8a and the original-direction recognizing unit 8b at respective directions of 0 degree, 90 degrees, 180 degrees, and 270 degrees, thereby distinguishing whether the text in the original data is portrait or landscape and distinguishing the top edge from the bottom edge of the original (Step S3).

When there is no character data in the original, or when the character cannot be recognized because the character data blurs, the character is too dark, or the like, the text-direction recognizing unit 8a and the original-direction recognizing unit 8b may fail distinguishing the top edge from the bottom edge. However, even in this case, as in the first embodiment, when the location of the symbolic information is centered from every direction, i.e., centered either in a vertical or horizontal direction, in the original, the symbolic information described later can be obtained even when the top-and-bottom-edge determination of the original direction fails. The symbolic information is centered both in the vertical and horizontal directions, and thus, the symbolic information can be searched for and obtained regardless of a direction in which the original is scanned, i.e., the vertical direction and the horizontal direction.

Next, the symbolic information is searched for. The symbolic information is recorded in a predetermined size in a predetermined location (a specific area in a central portion of the original in the first embodiment) of the original (device-control setting medium) as shown in FIG. 3. The image-processing control unit 8 searches whether the setting information is recorded in the specific area loaded selectively in the original data.

That is, after distinguishing the top edge from the bottom edge of the image data (original data) of the original (Step S3), right/left and top/bottom areas of the original data are cut off (Step S4), and the direction of the original data is property oriented so that only the pixel data in the central specific area within the original data (a reading area in a predetermined location fixedly determined in advance) is read out (Step S5).

To fix the specific area to be read, a determined coordinate area can be extracted. In the first embodiment, it is so adapted in advance that the symbolic information is printed (marked) at the center location, in the both vertical and horizontal directions, and thus, it is necessary that both an x-axis coordinate value and a y-axis coordinate value defining a reading operation range (corresponding to the data within the area) are matched to the fixed area (the specific area).

Provided that the fixed area be defined as an area that is obtained by cutting a quarter of the right/left and upper/lower areas, the pixel data of only an area of an xy-coordinate (620, 877) to an xy-coordinate (1,860, 2,631) can be loaded.

Upon completion of reading the pixel data in the fixed area within the original data, the image-processing control unit 8 analyzes the fixed area data to determine whether the symbolic information exists (Step S6). When the original conforming to the condition in the first embodiment is provided, the setting information is recorded in the fixed area of the original by utilizing the QR code that is analyzed at Step S6 and is the two-dimensional code used in the present embodiment.

More specifically, the setting information is recorded in a predetermined location (a center of the original, i.e., a location equally spaced from top/bottom ends and right/left ends; the specific area) of an original print paper as the device-control setting medium as shown in FIG. 3. The image-processing control unit 8 searches whether the predetermined setting information is recorded in the area within the original data.

Figure 5:
FIG. 5 is an enlarged schematic diagram of a sample of a QR code that is a two-dimensional code (symbolic information)

As an expression mode of the symbolic information, a sample of the QR code as a representative example of the two-dimensional code, for example, is shown in an enlarged manner in FIG. 5. When the QR code is used, to search for the symbolic information in the original, squares at three corners called a location detection pattern are searched for to detect the location and the orientation. The location detection pattern is configured by three location detection elements arranged at the three corners of the QR code. The location of the QR code is detected based on the location detection pattern.

When the two-dimensional code (symbolic information) of the setting information is searched for in the predetermined location within the original data as a result of the search (YES at Step S6), this information is read and stored in the memory unit 3 (in a different location, as needed), and the CPU 2 is notified of a possibility that the predetermined device-control setting medium is used as the original. Instead of restoring the information in the memory unit 3, the location of the detected QR code can be transmitted.

When the symbolic information (setting information) cannot be searched for in the predetermined location within the original data (NO at Step S6), it is determined that this original is a normal original, and thus, the search process is ended. Thereafter, a predetermined original reading process is performed. Before the predetermined reading process is performed, a well-known search process in which an entire original surface is searched to check whether there is the setting information can be provided.

Figure 6:
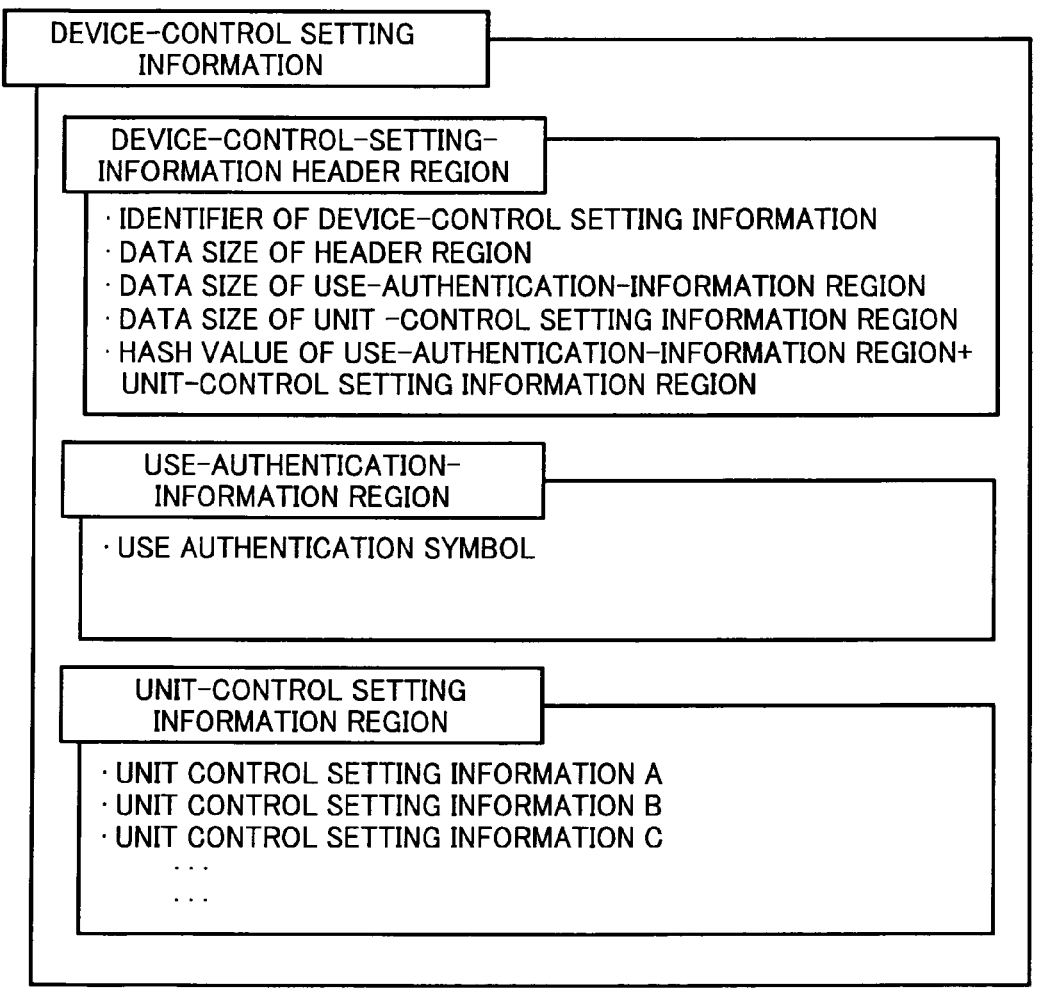
FIG. 6 is a schematic diagram of setting information according to the first embodiment.
Figure 12:
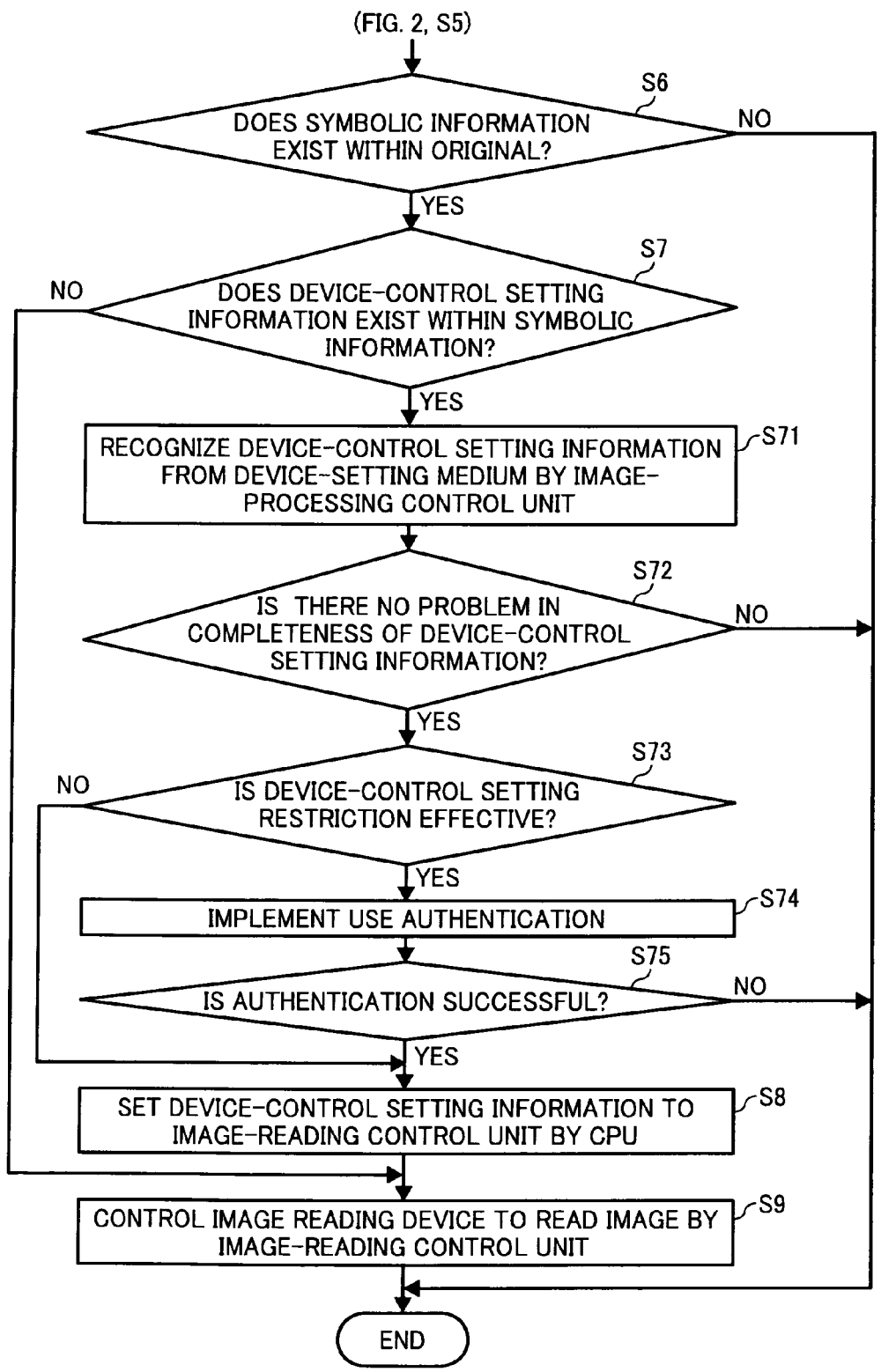
FIG. 12 is a reference flowchart (partial) of an example of analysis for the symbolic information (two-dimensional code)

Upon reception of the notification that the device-control setting medium (original) is used, the CPU 2 analyzes the symbolic information (two-dimensional code) stored in the memory unit 3 to determine whether the device-control setting information exists within the symbolic information (Step S7). The setting information is configured by a setting-information header region, a use-authentication-information region, and a unit-control setting information region, as shown in FIG. 6. Thus, the CPU 2 firstly refers to a portion corresponding to the setting-information header region to confirm whether data stored therein matches an identifier of the setting information. After it is thereby confirmed that the original is the device-control setting medium, it is preferable to check, and so on, the setting information to confirm completeness of the setting information. However, this operation is not directly related to the present invention. Thus, in FIG. 12, a reference flowchart of an example of following processes when the setting information exists within the symbolic information of the original (YES at Step S7 in FIG. 2) is shown only, and a detailed description thereof is omitted.

When it is determined that the two-dimensional code is the setting information as a result of the analysis of the setting-information header region (YES at Step S7), the device-control setting information is set to the image-reading control unit (Step S8), and the image-reading control unit controls the image reading device 17 to read the image (Step S9). When the determination at Step S7 is YES, it is preferably followed by checking use authentication information as a restriction of the device control (see the reference flowchart in FIG. 12). However, this operation is not directly related to the present invention, and thus, a detailed description thereof is omitted. When the setting information cannot be found within the symbolic information (NO at Step S7), a predetermined original reading process is performed (with a default setting and by a user operation).

The unit-control setting information region can include a plurality of pieces of unit control setting information. As a rule, the CPU 2 sets and executes the unit control setting information sequentially from one arranged at a head of the unit-control setting information region. However, in this case, a script for controlling an execution order can be arranged to change the execution order.

The CPU 2 interprets the unit control setting information, performs a setting instructed to an appropriate unit (Step S8), and executes the requested process. As a specific example, a case that image reading control is performed on the unit-control setting information is described. In the first embodiment, when the image reading is performed, the image-processing control unit 8 and the image-reading control unit 12 are set based on the unit control setting information, and each unit is operated in accordance with the setting to read the original. That is, the CPU 2 interprets the unit-control setting information within the setting information, and the image reading device reads the image under the control of the image-reading control unit 12 (Step S8).

Specifically, the CPU 2 reads unit-control setting information A of the unit-control setting information region and recognizes that this information is "image-reading control unit setting: resolution=300 dpi". In this case, the image-reading control unit 12 is designated as a target unit, and thus, the CPU 2 queries the image-reading control unit 12 whether it is possible to set the "resolution". When a setting item of the "resolution" exists in the image-reading control unit 12, information of "300 dpi" is written in the setting item.

Next, the CPU 2 reads unit control setting information B to recognize that this information is "image-reading control unit setting: color mode=full color". This setting information is also a setting targeting the image-reading control unit 12, so that the CPU 2 queries the setting item of the image-reading control unit 12 and writes the setting information in the corresponding item.

Thereafter, the CPU 2 reads unit-control setting information C as a next setting and recognizes that this information is "image-reading control unit control: execute reading". In this way, the CPU 2 recognizes the control items, and sequentially selects and executes several operations.

In the above example, the original is placed on the optical original reading table, and thus, the CPU 2 is able to utilize the display control unit 13 to display on the display device 18 a message of "set a reading original and press a start button" and wait until a user operation instruction is notified from the input control unit 9.

As another example, when the original that is the device-control setting medium is placed on an automatic original reading device not on the optical original reading table, an original to be placed next can be automatically fed and the original reading process can be performed based on a parameter set on the original.

In the first embodiment, the symbolic information is read from within the original and the setting information is obtained in accordance with the procedure described above, and the predetermined operation is sequentially executed in accordance with the setting information. Because the symbolic information is the QR code that is the two-dimensional code, the location thereof is searched for by searching for the location detection pattern. In this case, it is sufficient to search a limited range of the original, so that a much faster detection can be made as compared with a case that the entire range of the original is searched and an erroneous detection of the two-dimensional code can be also decreased, and hence efficient. Because the limited range search suffices even when a two-dimensional code other than the QR code is used, the faster detection can be made and erroneous detections of the two-dimensional code can be decreased.

Figure 7:
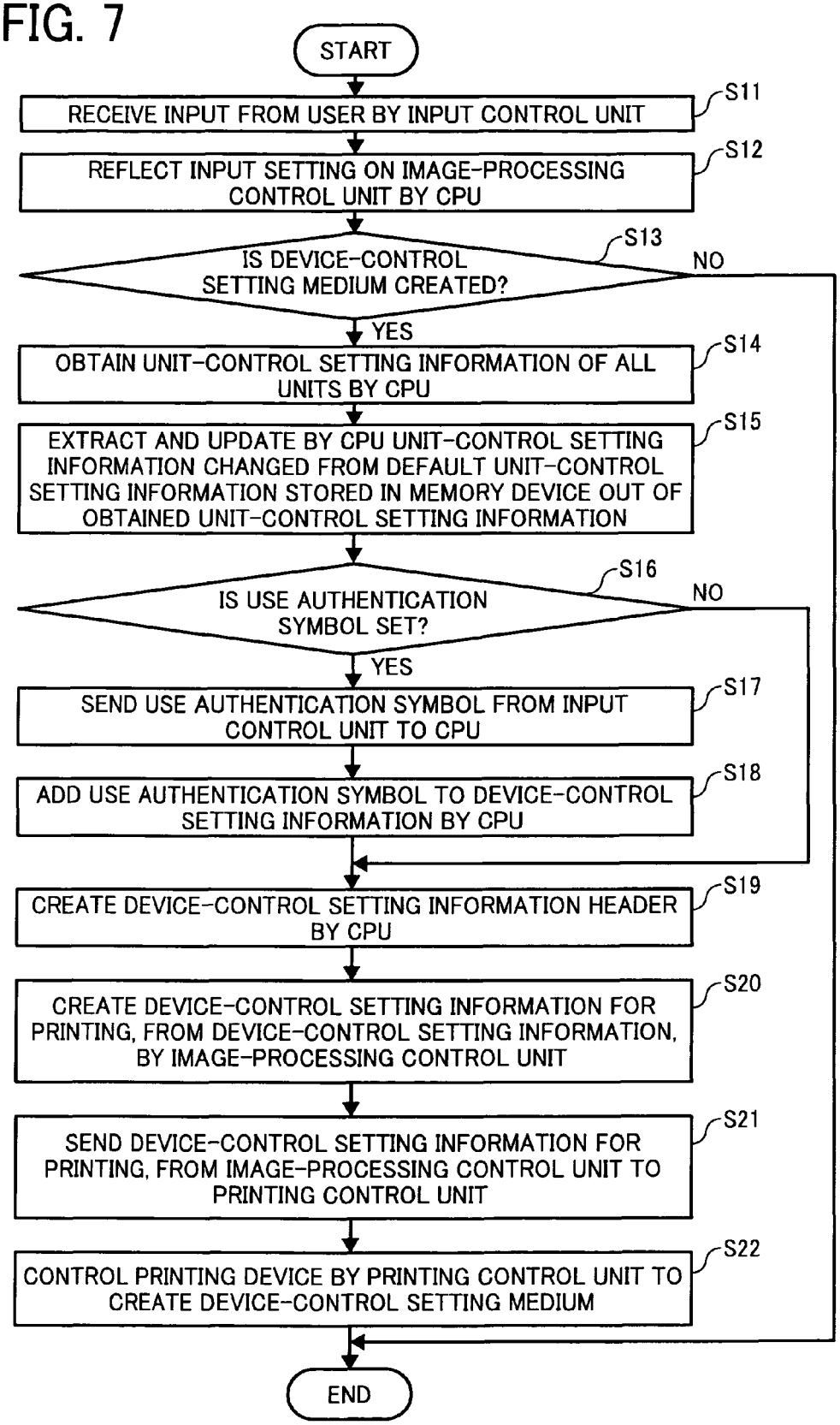
FIG. 7 is a flowchart of a method of creating the original according to the first embodiment.

The original (device-control setting medium) is explained next. The original can be also created by using a printing device or the like as needed. However, in this case, associating an operation with codes, for example, is a very complicated procedure. However, the digital copier includes a symbolic-information adding unit that adds the symbolic information in which a predetermined operation instruction of the multi-functional input/output apparatus is symbolized in a specific area location of the original data. Therefore, the device-control setting medium (original) can be easily created by the symbolic-information adding unit. The symbolic-information adding unit is realized by the CPU 2 causing the printing control unit 11 and the printing device 16 to cooperate with each other via the image-processing control unit 8. The symbolic-information adding unit prints the QR code that is the two-dimensional code, together with other associated data for distinguishing a medium or the like, in an appropriate size that is set (determined) as the specific area in the first embodiment and is adjusted (centered) to the location equally spaced from the top/bottom end and right/left end of the original. FIG. 7 is a flowchart of a method of creating the device-control setting medium (original) in the digital copier 1. The operation is explained below with reference to FIG. 1.

When the device-control setting medium (see FIG. 3) configured to perform a control setting desired by the user in the digital copier 1 is not provided, the device-control setting medium (original) can be created by several methods. A method is explained as one example, in which the items set when a paper original is read are output as the device-control setting medium.

The user places the paper original on the optical original reading table, and sets an original reading parameter by utilizing the display device 18 and the operation input device 19 (Step S11). In this case, as the reading parameter of this time, "reading resolution: 300 dpi" and "color mode: monochrome" are set as examples.

The setting parameter is stored by the CPU 2 into the image-reading control unit 12 and is utilized when the paper original is read (Step S12). When the parameter setting ends, the user performs a reading start operation to start reading the paper original. Upon being instructed to start reading as a result of the user operating the operation input device 19, the input control unit 9 issues a reading start notification to the CPU 2 and the image-processing control unit 8. The image-processing control unit 8 issues the reading start notification to the image-reading control unit 12, reads the paper original by the image reading device 17 (in this case, the optical original reading table), and stores the read original data in the memory unit 3.

Figure 8:
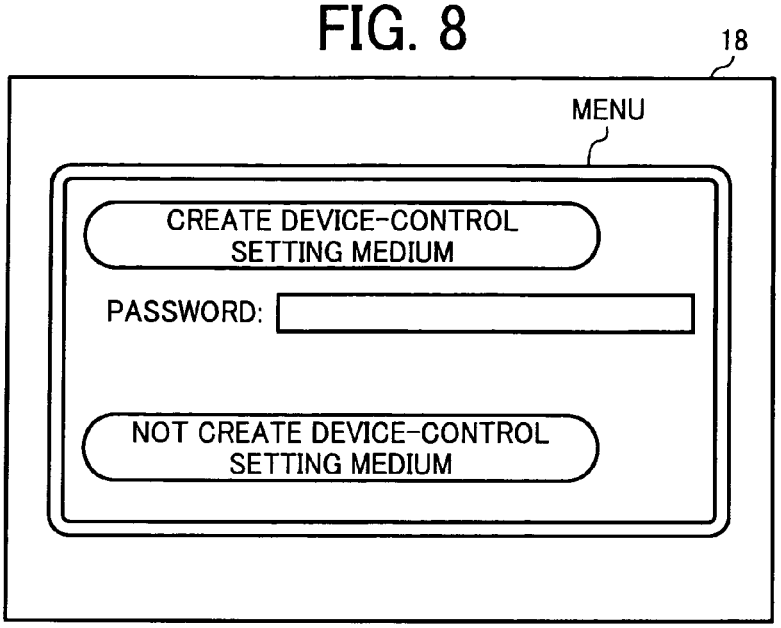
FIG. 8 is a schematic diagram of an example of a screen display for querying creation of the original according to the first embodiment.

The CPU 2 that receives the reading start notification utilizes the display control unit 13 to query the user of presence or absence of the output of the device-control setting medium (original) and of implementation of the device-control setting restriction (Step S13). For this query, for example, a menu as shown in FIG. 8 is used, in which buttons of "create device-control setting medium" and "not create device-control setting medium" and a password input form are displayed to request the user to select the setting.

On this menu, the presence or absence of the device-control setting restriction is determined by a method in which when there is the input in the password input form, the device-control setting restriction is rendered effective. The menu can be so configured that a displaying time is set and the display of the menu is cleared after an elapse of the displaying time by automatically regarding that a selection item set by default is selected.

When "create device-control setting medium" is selected as a result of the query, the CPU 2 queries all the connected units for the setting information and obtains all the unit-control setting information (Step S14). The CPU 2 compares all the obtained unit-control setting information with a default value list of all the unit control setting information stored in the memory device 10 to extract a portion changed from the default value in the obtained unit-control setting information (Step S15).

Upon detection of the changed unit-control setting information, the CPU 2 converts the unit-control setting information into a code to be added to the setting information, and stores the converted code in the unit-control setting information region of the setting information (setting information change).

As described above, in the example, the reading executions are performed under the condition of "reading resolution: 300 dpi", "color mode: monochrome" while other settings are remained by default. After the changed unit-control setting information is updated and all the unit-control setting information is stored, "image-reading control unit control: execute reading" is stored as subsequent unit control setting information, and the creation of the unit-control setting information region ends.

Next, it is confirmed whether the password is input via the password input form on the menu shown in FIG. 6 (Step S16).

When the password is input (YES at Step S16), the password is sent from the input control unit 9 to the CPU 2 (Step S17) and stored in the use-authentication-information region (Step S18). At this time, the password can be encrypted to further enhance the security.

With the process so far, the creation of a data portion (the unit-control setting information region and the use-authentication-information region) of the setting information ends, and thus, the device-control setting-information header region is created (Step S19). At first, the data in the use-authentication-information region and that in the unit-control setting information region are combined, and the combined data is stored in the device-control setting-information header region.

Next, a "data size in a header region", a "data size in the use-authentication-information region", and a "data size in the unit-control setting information region" are calculated, which are stored in the device-control setting-information header region. Then, an "identifier of the device-control setting-information" is stored in the device-control setting-information header region, thereby completing the creation of the setting information. The "identifier of the device-control setting-information" can indicate that this information is the setting information (device-control setting information) and can include a version or a handling method of the device-control setting information.

Upon ending the creation of the setting information, the CPU 2 sends the setting information and an output request of this information to the image-processing control unit 8. The image-processing control unit 8 that receives the output request converts a format of the setting information into a format that can be output to an optically readable medium such as a two-dimensional code, and creates setting information for outputting (device-control setting information) (Step S20). The CPU 2 sends the setting information for outputting from the image-processing control unit 8 to the printing control unit 11 (Step S21), and outputs the setting information for outputting from the printing device 16 using the printing control unit 11, thereby creating the device-control setting medium (Step S22).

Figure 9:
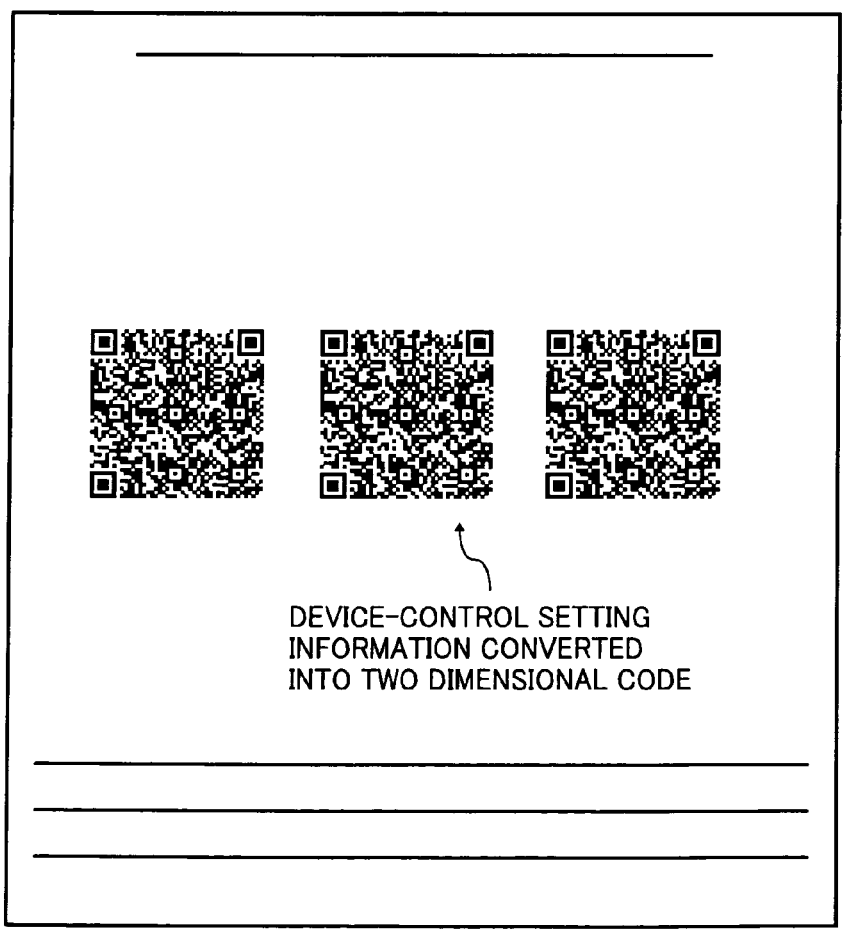
FIG. 9 is a schematic diagram of an example of setting information according to a second embodiment of the present invention.

A process in a digital copier (of which the hardware configuration is similar to that in FIG. 1) according to a second embodiment of the present invention is explained next. The number of symbolic information (two-dimensional code) arranged within the original is not necessarily one, and a plurality of pieces of symbolic information can be arranged within the original. A layout in which a plurality of pieces of symbolic information is arranged in the original is shown in FIG. 9. When the number of symbolic information to be arranged is large, it is obvious that the symbolic information cannot be arranged at the center from either top/down or right/left. Even in this case, as shown in FIG. 9, when each symbolic information is arranged in a straight line to be kept equally (at the center) apart from top-and-bottom end sides of the original, if the scan direction of the original is fixed corresponding to the arrangement, it becomes possible to obtain the symbolic information even when the top-and-bottom-edge determination of the original direction fails. The same is true for a case that each symbolic information is arranged in a straight line to be kept equally apart (at the center) from right-and-left end sides of the original.

Also in the second embodiment, the data on the original is read, and the result is stored in the memory unit 3. A size of the data on the memory is expressed by a horizontal width and a height. When a data format is a bitmap format, the size of the data is expressed by a two-dimensional coordinate system where a lower left of a data area serves a point of origin coordinate and the horizontal width represents an x-axis and the height represents a y-axis. For example, when A4 original data (vertical) of 300 dpi is concerned, the horizontal width is 2,480 pixels, the height is 3,508 pixels, and the entire range of coordinate is xy-coordinates of (0, 0) to (2,480, 3,508) (FIG. 4: see the xy-coordinate system).

To fix the specific area to be read, a determined coordinate area can be extracted. In the second embodiment, because it is so specified that the symbolic information is marked at the center in the vertical direction, the y-axis coordinate value needs to be set to the fixed area (specific area). Provided that the fixed area be a remaining area obtained by cutting upper and lower quarters, the pixel data only in an area of xy-coordinates (0, 877) to xy-coordinates (2,480, 2,631) is loaded, and the read pixel data can be stored in the memory unit 3.

Thus, the symbolic information is searched for within the selectively loaded area. The search process and processes thereafter are similar to those already described, and therefore explanations thereof will be omitted. A series of the flows are shown in a flowchart in FIG. 10.

Figure 10:
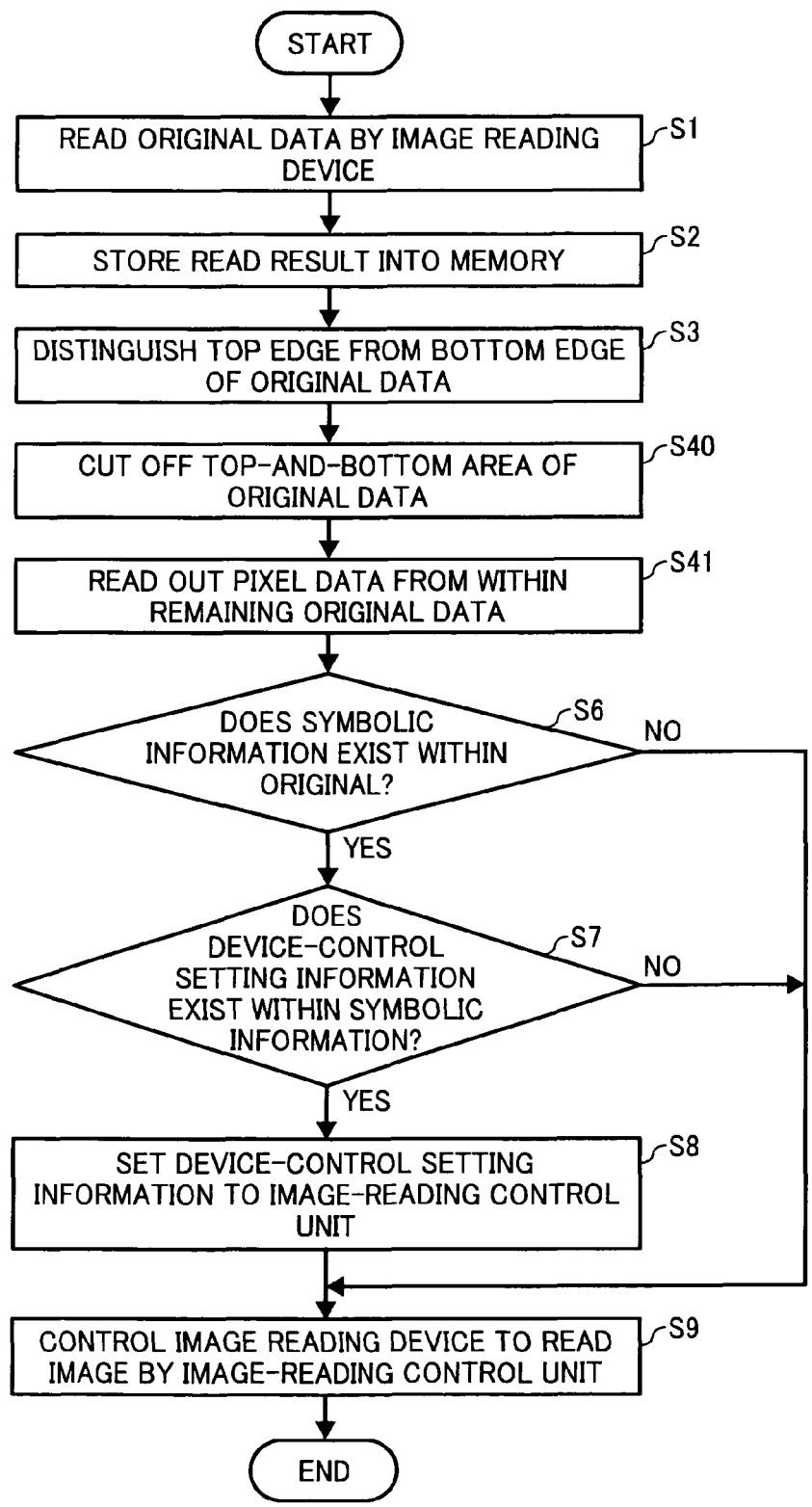
FIG. 10 is a flowchart of a method of utilizing a device-control setting medium (original) according to the second embodiment.

According to FIG. 10, after the processes similar to those in FIG. 2 (Steps S1 to S3), the top and bottom of the original data are cut off (Step S40), and the pixel data is read out from within the remaining original data area (Step S41). Thereafter, the processes completely similar to those in FIG. 2 are performed (Steps S6 to S8). Also in the second embodiment, the QR code that is the two-dimensional code as the setting information can be searched for in a limited range, so that a much faster detection can be made as compared with a case that the entire area of the original is searched and erroneous detections of the two-dimensional code can be decreased, and hence efficient.

In the above descriptions, to load the symbolic information in the specific area in a fixed manner, it is necessary that the original size and the resolution at the time of the original reading remain constant, and the description is based on this assumption. For example, the original size is fixed to A4 size, and the resolution at the time of the reading is fixed to 300 dpi. Needless to say, such a restriction is uncomfortable to use. To solve this problem, even when the size of the read original differs from the fixed size used by the resolution at the time of the reading for the process described above, the loaded data can be processed by keeping a vertical-to-horizontal ratio constant while the loaded data is compressed and decompressed.

Accordingly, a digital copier according to a third embodiment of the present invention further includes the image converting unit 8c (not shown) in the image-processing control unit 8 as image compressing/decompressing unit that compresses and decompresses the loaded original data to a size that can be read out from the specific area (near the symbolic information printing location) in a fixed manner completely similarly as described above. A result of reading the data on the original is stored in the memory unit 3, and thus, the compression and decompression are performed on the memory unit 3.

First, in the third embodiment, similar to the embodiments, the data (original entire-surface data) stored in the memory unit 3 is read. Thereafter, the data is compressed or decompressed by the image compressing/decompressing unit 8c, and thereby, the original size is adjusted and the resolution is property set. For example, the resolution of the original data that is already read is compressed or decompressed to 300 dpi at the time of A4-size reading.

After this process, similar to the embodiments described above, the area is selectively loaded and the symbolic information is searched for within the area. The process of selectively loading the fixed specific area after the compressing or decompressing process, the search process of the symbolic information within the area, and each process thereafter can be similar to those already described.

Figure 11:
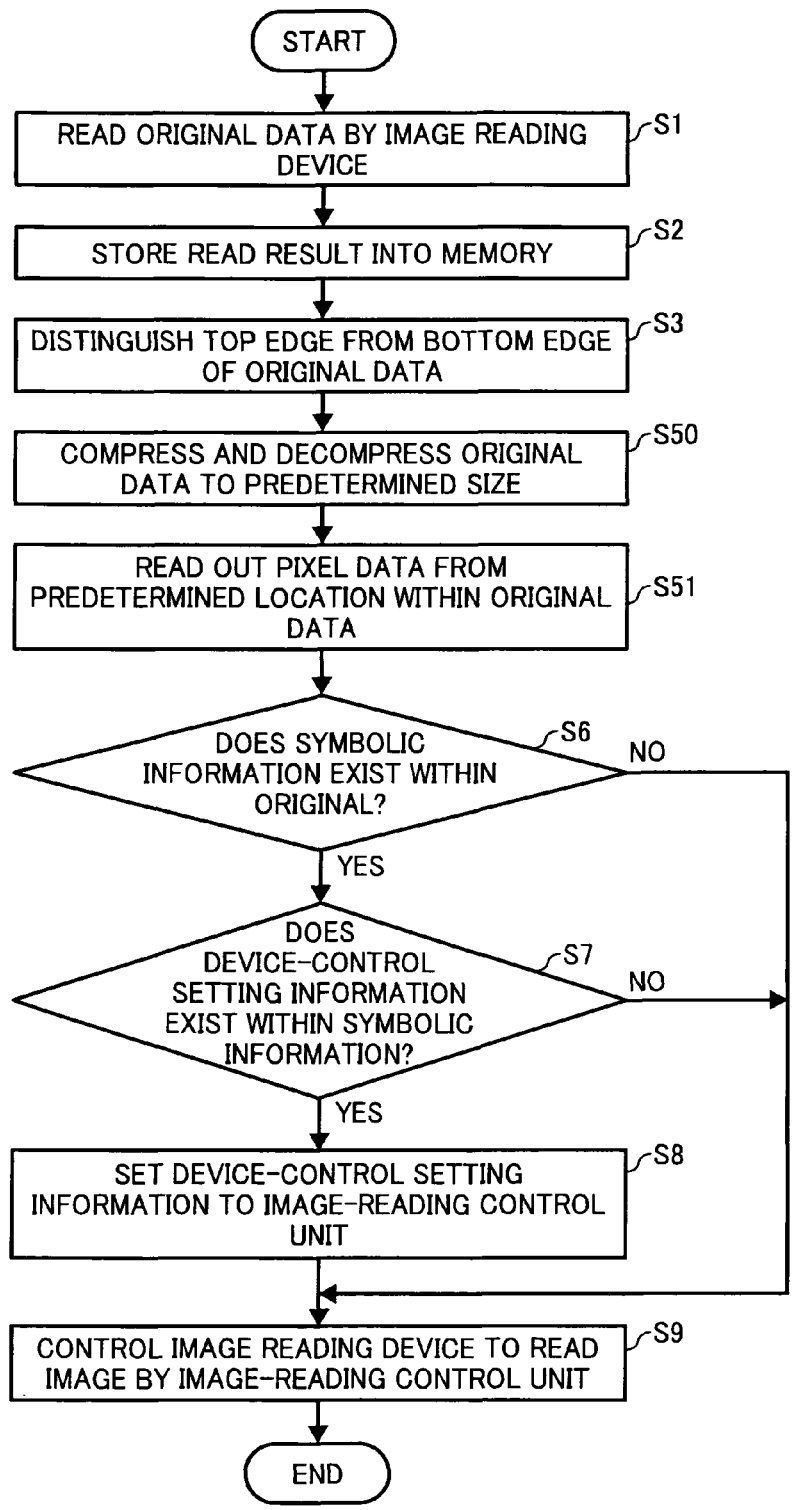
FIG. 11 is a flowchart of a method of utilizing a device-control setting medium (original) according to a third embodiment of the present invention.

A flow of the process is shown in the flowchart in FIG. 11 and it is described below. Detailed explanations of the processes already described will be omitted. According to FIG. 11, after the processes (Steps S1 to S3) similar to those in FIG. 2, the original data is decompressed to a predetermined size (Step S50). The symbolic information is read out from a predetermined location within the original data (Step S51). Thereafter, the processes completely similar to those in FIG. 2 (Steps S6 to S8) are performed.

Thereby, the reading start operation is performed from the input control unit, and the instruction information is transmitted to the CPU. In reception thereof, the CPU causes the image-processing control unit to execute operation control of the image-reading control unit.

Also in the third embodiment, similar to the embodiments described above, the QR code that is the two-dimensional code as the setting information can be searched for in a limited range only, and thus, a much faster detection can be made as compared with a case that the entire area of the original is searched, and erroneous detections of the two-dimensional code can be decreased, and hence efficient. In addition thereto, the third embodiment includes a function of reading out the symbolic information by compressing or decompressing the loaded original data to a size that can be read out from the specific area (near the symbolic information printing location) in a fixed manner. Thus, even originals of various sizes and an original including the symbolic information printed with a different resolution can be accepted, and it excels in usability.

Figure 13:
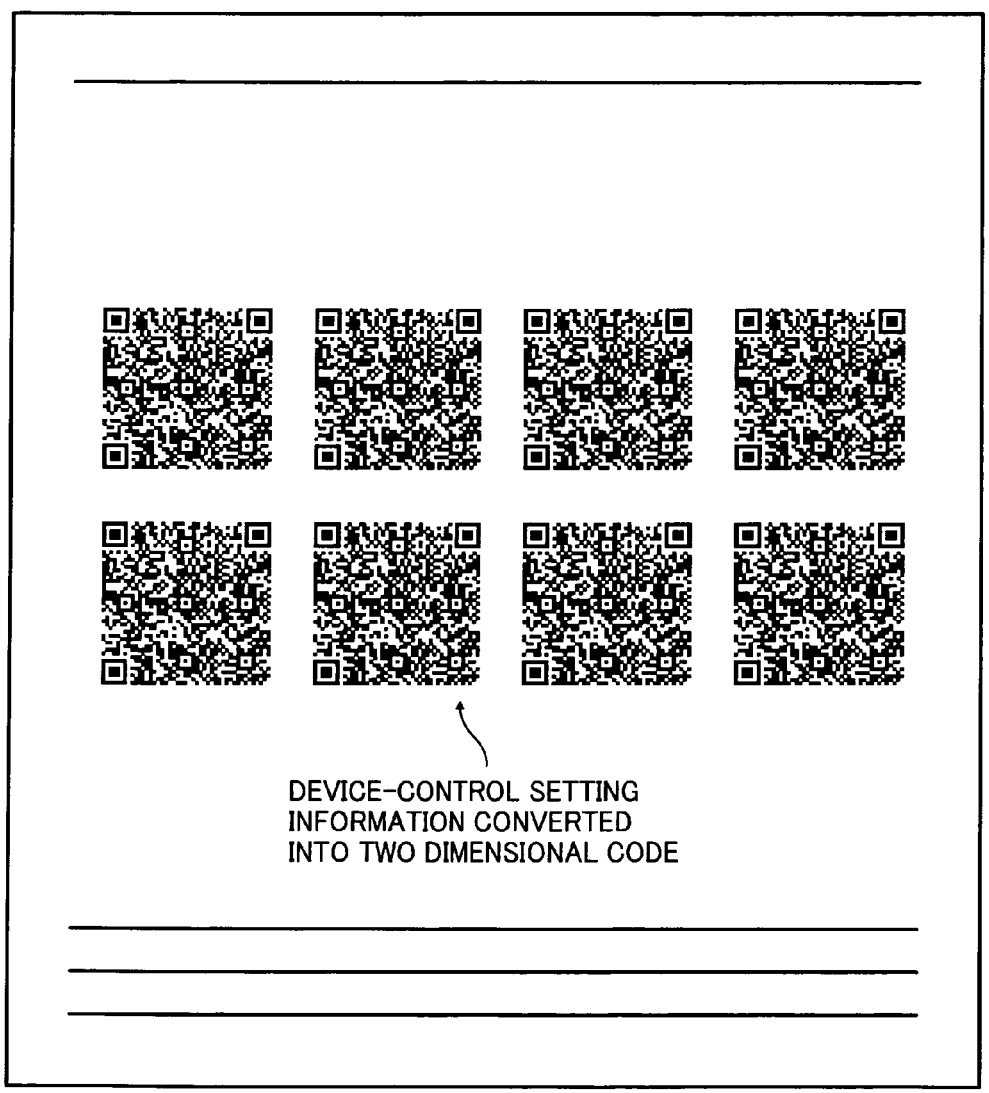
FIG. 13 is a schematic diagram of an example of setting information according to a fourth embodiment of the present invention.

In the embodiments described above, the symbolic information is arranged in a straight line. However, the arrangement is not limited thereto. According to a fourth embodiment of the present invention, as shown in FIG. 13, a plurality of pieces (eight in FIG. 13) of symbolic information can be arranged in two straight lines at an approximate central position in the vertical direction of the original. In this case, the digital copier can regard an area including all the symbolic information as the specific area, and reads only this specific area portion and determines presence or absence of the symbolic information. The digital copier can analyze each of the detected eight QR codes, perform necessary settings in accordance with the included setting information or the like, and execute the designated process. As compared with the embodiments described above, only the range of the specific area (cut-out area) differs, and the individual processes are similar to those in the above embodiments. While versatile and numerous device-control settings can be made, only the specific limited area is read when extracting the setting information, and therefore a faster detection as compared with conventional cases can be made.

In the digital copier according to the embodiments described above, the original data having the symbolic information added in the specific area is generated, and the generated data is output to and printed on paper, thereby creating the original. In a fifth embodiment of the present invention, in addition to such an output mode, an output mode in which the generated original data is output to the copier in a different form, or the generated original is output to a different digital copier of the same type can be also imparted. That is, in the fifth embodiment, the digital copier is so configured to combine, as needed, various output modes such as the original data is sent as an electronic mail via a network, the same is set to an external device via a network, the same is set in a facsimile transmission, the same is saved in a storage unit provided in the digital copier, the same is saved in a storage unit connected to the digital copier. On the contrary, when receiving the original data in thus described mode from another device, the digital copier includes a function of expanding the received original data on the memory unit 3 for usage.

Note that a configuration for the above and its related technique are easily understood by persons skilled in the art, and they have been already proposed by the present applicant, together with other invention contents (see Japanese Patent Application No. 2006-153295). Because the details of the configuration and the related technique are described in the above patent application, descriptions thereof will be omitted in this specification. In Japanese Patent Application No. 2006-153295, there is also a disclosure of a technique regarding checking setting information and checking use authentication information as a device control restriction, which correspond to the reference flowchart in FIG. 12.

In a different digital copier (which is assumed to include a setting/executing function and a communication function by the setting information) that receives such original data, the control written on the original can be immediately used. Meanwhile, when receiving the similar original from another copier corresponding to the fourth embodiment, if the digital copier according to the fifth embodiment is used, the original can be immediately utilized. When a plurality of digital copiers, including the digital copier according to the fourth embodiment, is connected over a network, it becomes possible to adapt these digital copiers as a useful digital copier system.

In the embodiments described above, the entire original (setting medium) is once loaded into the memory unit 3, and thereafter, the symbolic information in the corresponding specific area is searched for. However, the present invention also includes a manner in which at the first reading, only the predetermined specific area on the initial original (setting medium) is loaded, only data corresponding to the specific area is regarded as a process target, and in this state, determination (search) of presence or absence of the symbolic information and decoding the symbolic information by decoding unit are performed. In this mode also, it is possible to obtain an effect in which a loading time of the symbolic information (two-dimensional information code) written on the device-control setting medium can be shortened as compared with the conventional case, of which the effect is equivalent to that in the embodiments described above.

The digital copier has been described as the embodiments of the present invention. However, in addition thereto, the present invention can be also applied to a multifunctional input/output apparatus including the input/output function described in detail in the embodiments.

Furthermore, various other embodiments can be made without departing from the scope the present invention. That is, the digital MFP is operated by a process, means, a function executed in a computer by a program command. In the computer program, a command is sent to each constituent element of the computer to perform a predetermined process or function, described above, i.e., a process is performed by the image-processing control unit, for example, in which the top/button and right/left of the original data of which the original surface is read into a digital format are cut, only the pixel data in the specific area in the central portion is read out, the read-out pixel data is analyzed to determine whether the symbolic information (QR code) exists. When the symbolic information exists in the determination, the CPU is caused to determine whether the device-control setting information exists within the symbolic information. When the device-control setting information exists, the CPU is caused to obtain the unit-control setting information from the device-control setting information and to interpret the unit control setting information, thereby performing a process requested to a designated unit. Thus, each process or means in the above embodiments is realized by specific means in which the computer program and the computer work together.

Also via a computer-readable recording medium, i.e., a storage medium, having recorded therein a program code of software for realizing the function in the above embodiments, for example when the computer (CPU) in the digital MFP reads out and executes the program code stored in the storage medium, the object of the present invention can be achieved. The computer program can be executed by directly being loaded into the computer through a communication line, without going through the recording medium. Thereby, the object of the present invention is also achieved.

In this case, the program code itself that is read out from the storage medium or loaded and executed through the communication line is to serve the function of the embodiments described above. The storage medium having the program code stored therein configures the present invention.

For the storage medium that supplies the program code, a floppy disk, a hard disk, an optical disk, a magneto optical disk, a CD-ROM, a CD-recordable (CD-R), a nonvolatile memory card, a ROM, or a magnetic tape can be used, for example.

According to an aspect of the present invention, a loading time of the symbolic information (two-dimensional information code) written in the device-control setting medium can be shorted as compared with conventional cases, and prevention of erroneous detections can be also achieved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A multifunctional input/output apparatus comprising:
   a reading unit that reads an original to obtain original data;
   an image forming unit that forms an image on a recording medium based on the original data;
   a decoding unit that decodes, when the original data contains symbolic information that is encoded information of a predetermined operation instruction, the symbolic information to obtain the operation instruction; and
   an executing unit that executes an operation indicated by the operation instruction obtained by the decoding unit, wherein
   the reading unit reads a specific area of the original preassigned for the symbolic information, wherein the reading unit is configured to cut off top, bottom, left and right areas around the specific area of the original data to leave only the specific area of the original data for the reading unit to read, and
   when the symbolic information is obtained from the specific area, the decoding unit decodes the symbolic information obtained from the specific area.

2. The multifunctional input/output apparatus according to claim 1, wherein the specific area is located substantially at a center of the recording medium.

3. The multifunctional input/output apparatus according to claim 1, wherein the specific area is located at a position along a center line in a longitudinal direction of the recording medium.

4. The multifunctional input/output apparatus according to claim 1, wherein the specific area is located at a position along a center line in a lateral direction of the recording medium.

5. The multifunctional input/output apparatus according to claim 1, further comprising a symbolic-information adding unit that adds the symbolic information to the specific area of the original data that does not contain symbolic information, wherein
the image forming unit forms an image of the recording medium based on the original data with the symbolic information added.

6. The multifunctional input/output apparatus according to claim 5, further comprising a data output unit that outputs the original data with the symbolic information added by way of at least one of sending an electronic mail with the original data attached via a network, sending the original data to an external device via a network, sending the original data by facsimile, and saving the original data in a storage unit.

7. The multifunctional input/output apparatus according to claim 1, wherein the specific area is located at a position along a center line, in at least one of a longitudinal direction and a lateral direction of the recording medium.

8. The multifunctional input/output apparatus according to claim 1, wherein the image compressing/decompressing unit is configured to keep a vertical-to-horizontal ratio of the original data constant as the original data is compressed or decompressed to ensure that the specific area is read by the reading unit.

9. The multifunctional input/output apparatus according to claim 1, wherein the decoding unit includes an image compressing/decompressing unit that compresses or decompresses, when a size of the original data is different from a prefixed size, the original data to the prefixed size in which the symbolic information can be read out from the specific area in a fixed manner.

10. A method of controlling a multifunctional input/output apparatus that includes a reading unit that reads an original to obtain original data and an image forming unit that forms an image on a recording medium based on the original data, the method comprising:
decoding, when the original data contains symbolic information that is encoded information of a predetermined operation instruction, the symbolic information to obtain the operation instruction; and
executing an operation indicated by the operation instruction obtained at the decoding,
masking, by the reading unit, the original data by cutting off top, bottom, left and right areas around a specific area of the original data to leave only the specific area of the original data for the reading unit to read,
wherein the reading includes reading the specific area of the original preassigned for the symbolic information, and
when the symbolic information is obtained from the specific area, the decoding includes decoding the symbolic information obtained from the specific area.

11. The method of claim 10, wherein the decoding includes compressing or decompressing, when a size of the original data is different from a prefixed size, the original data to the prefixed size in which the symbolic information can be read out from the specific area in a fixed manner.

12. The method of claim 11, wherein the compressing or decompressing of the original data includes keeping a vertical-to-horizontal ratio of the original data constant as the original data is compressed or decompressed to ensure that the specific area is read by the reading unit.

13. A non-transitory computer-usable medium having computer-readable program codes embodied in the non-transitory computer-usable medium for controlling a multifunctional input/output apparatus that includes a reading unit that reads an original to obtain original data and an image forming unit that forms an image on a recording medium based on the original data, the non-transitory computer-usable medium causing a computer to execute:
decoding, when the original data contains symbolic information that is encoded information of a predetermined operation instruction, the symbolic information to obtain the operation instruction; and
executing an operation indicated by the operation instruction obtained at the decoding,
masking, by the reading unit, the original data by cutting off top, bottom, left and right areas around a specific area of the original data to leave only the specific area of the original data for the reading unit to read,
wherein the reading includes reading the specific area of the original preassigned for the symbolic information, and
when the symbolic information is obtained from the specific area, the decoding includes decoding the symbolic information obtained from the specific area.

14. The non-transitory computer-usable medium of claim 13, wherein the decoding includes compressing or decompressing, when a size of the original data is different from a prefixed size, the original data to the prefixed size in which the symbolic information can be read out from the specific area in a fixed manner.

15. The non-transitory computer-usable medium of claim 14, wherein the compressing or decompressing of the original data includes keeping a vertical-to-horizontal ratio of the original data constant as the original data is compressed or decompressed to ensure that the specific area is read by the reading unit.

* * * * *